(12) United States Patent
Wilson et al.

(10) Patent No.: US 9,293,051 B2
(45) Date of Patent: Mar. 22, 2016

(54) METHODS AND SYSTEMS FOR DISPLAYING A VERTICAL PROFILE FOR AN AIRCRAFT PROCEDURE WITH NONUNIFORM SCALING

(75) Inventors: Blake Wilson, Peoria, AZ (US); Roger W. Burgin, Scottsdale, AZ (US); Michael Chytil, Brno (CZ)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 2021 days.

(21) Appl. No.: 12/427,521

(22) Filed: Apr. 21, 2009

(65) Prior Publication Data

US 2010/0265268 A1 Oct. 21, 2010

(51) Int. Cl.
*G09G 5/00* (2006.01)
*G09G 5/22* (2006.01)
*G06F 3/048* (2013.01)
*G08G 5/00* (2006.01)
*G08G 5/02* (2006.01)

(52) U.S. Cl.
CPC .............. *G08G 5/0021* (2013.01); *G08G 5/025* (2013.01)

(58) Field of Classification Search
USPC ................... 715/855; 345/619; 340/945–983; 701/14–16, 18
See application file for complete search history.

(56) References Cited

U.S. PATENT DOCUMENTS

| | | | |
|---|---|---|---|
| 6,085,129 A * | 7/2000 | Schardt et al. ............... | 701/14 |
| 6,389,355 B1 | 5/2002 | Gibbs et al. | |
| 7,417,641 B1 | 8/2008 | Barber et al. | |
| 2006/0005147 A1 | 1/2006 | Hammack et al. | |

OTHER PUBLICATIONS

Serpen "Performance analysis of probabilistic potential function neural network", US Air Force Summer Research Program—1996, vol. 5, Dec. 1996.*

* cited by examiner

*Primary Examiner* — Yingchun He
(74) *Attorney, Agent, or Firm* — Ingrassia Fisher & Lorenz, P.C.

(57) ABSTRACT

Methods and systems are provided for presenting procedure information for a vertical profile on a display device associated with an aircraft. A method comprises displaying a first segment of the plurality of segments comprising a vertical profile with a first vertical scale and a first horizontal scale, wherein the first horizontal scale is based on a first distance associated with the first segment. The method further comprises displaying a second segment of the plurality of segments with the first vertical scale and a second horizontal scale, wherein the second horizontal scale is based on a second distance associated with the second segment. The first horizontal scale and the second horizontal scale are not equal. In this manner, the vertical profile has a nonuniform horizontal scale and a uniform vertical scale across segments.

20 Claims, 4 Drawing Sheets

METHODS AND SYSTEMS FOR DISPLAYING A VERTICAL PROFILE FOR AN AIRCRAFT PROCEDURE WITH NONUNIFORM SCALING

TECHNICAL FIELD

The subject matter described herein relates generally to avionics systems, and more particularly, embodiments of the subject matter relate to avionics systems and related cockpit displays adapted for displaying a vertical profile for an aircraft action such as an instrument approach.

BACKGROUND

Instrument procedures (e.g., instrument approach procedures or instrument departure procedures) are used to provide specific detailed instructions for the operation of aircraft in the airport terminal area, and allows air traffic control to reduce radio frequency congestion by communicating only the name of the procedure to be flown, rather than having to provide the verbose instructions otherwise required. For example, instrument approach procedures allow a pilot to reliably land an aircraft in situations of reduced visibility or inclement weather by using instruments onboard the aircraft or on the ground, such as radios or other communication systems, navigation systems, localizers, glidescopes, and the like. Published aeronautical charts, such as, for example, Instrument Approach Procedure (IAP) charts, Standard Terminal Arrival (STAR) charts, or Terminal Arrival Area (TAA) charts Standard Instrument Departure (SID) routes, Departure Procedures (DP), terminal procedures, approach plates, and the like, that depict and describe the instrument procedures for various airports, runways, or other landing and/or departure locations are provided by a governmental or regulatory organization, such as, for example, the Federal Aviation Administration in the United States. These charts graphically illustrate and describe the specific procedures (e.g., minimum descent altitudes, minimum runway visual range, final course or heading, relevant radio frequencies, missed approach procedures) to be followed or otherwise utilized by a pilot for a particular approach or departure. A pilot maintains copies of these printed charts for the various possible airports that the pilot may encounter during operation of the aircraft. For example, for worldwide operation, there are as many as 17,000 charts, and each airport may include multiple runways with multiple possible approaches and departures.

Typically, in advance of the actual approach or departure, the pilot identifies the airport and reviews the charts for the one or more approaches (or departures) for that airport. Once the pilot determines the approach (or departure) that the pilot intends to fly, the pilot and crew (e.g., the co-pilot) review features of the instrument procedure such that there is sufficient understanding and agreement on how the procedure should be executed based on the chart. These printed charts contain a significant amount of information making it difficult to display them in their entirety electronically onboard the aircraft. For example, in current electronic cockpit displays, the resolution and physical size of the electronic display limits or prevents the instrument procedure charts to be reproduced or replicated electronically. Furthermore, most of the display area on the electronic display is already utilized or reserved for other processes (e.g., navigational maps, profile views, synthetic vision displays, flight management windows, and the like) and presenting the instrument procedure chart risks interfering with or obfuscating these other processes.

Instrument approach plates include a vertical profile for a desired approach that consists of a series of navigational segments with constraining altitudes (e.g., minimum descent altitudes) and additional graphical and textual information corresponding to the various stages of the approach and/or departure. Often, the published vertical profiles are unscaled in both the horizontal and vertical dimensions. However, placing aircraft symbology and/or the terrain on a vertical profile that lacks a fixed vertical scale is misleading to the pilot. In addition, the navigational segments vary greatly in size, some being only a half mile or less while others may be ten or more miles long. Therefore, given the limited display area allocated to the vertical profile, attempting to display the navigational segments with a fixed scale causes some smaller navigational segments to be imperceptibly small and creates difficulty in displaying the necessary text between waypoints for the navigational segment, while some larger navigational segments require an unwieldy amount of the display area.

BRIEF SUMMARY

A method is provided for presenting procedure information for a vertical profile on a display device associated with an aircraft. The vertical profile comprises a plurality of segments between a first navigational reference point and a second navigational reference point. The method comprises displaying a first segment of the plurality of segments with a first vertical scale and a first horizontal scale, wherein the first horizontal scale is based on a first distance associated with the first segment. The method further comprises displaying a second segment of the plurality of segments with the first vertical scale and a second horizontal scale, wherein the second horizontal scale is based on a second distance associated with the second segment. In an exemplary embodiment, the first horizontal scale and the second horizontal scale are not equal.

In another embodiment, a method is provided for presenting procedure information for an aircraft action between a first navigational reference point and a second navigational reference point on a display device associated with an aircraft. The method comprises rendering a vertical profile for the aircraft action on the display device with a uniform vertical scale and a nonuniform horizontal scale, and rendering a graphical representation of terrain on the display device within the vertical profile. The graphical representation of terrain is rendered based on the uniform vertical scale and the nonuniform horizontal scale.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Embodiments of the subject matter will hereinafter be described in conjunction with the following drawing figures, wherein like numerals denote like elements.

DETAILED DESCRIPTION

Figure 1:
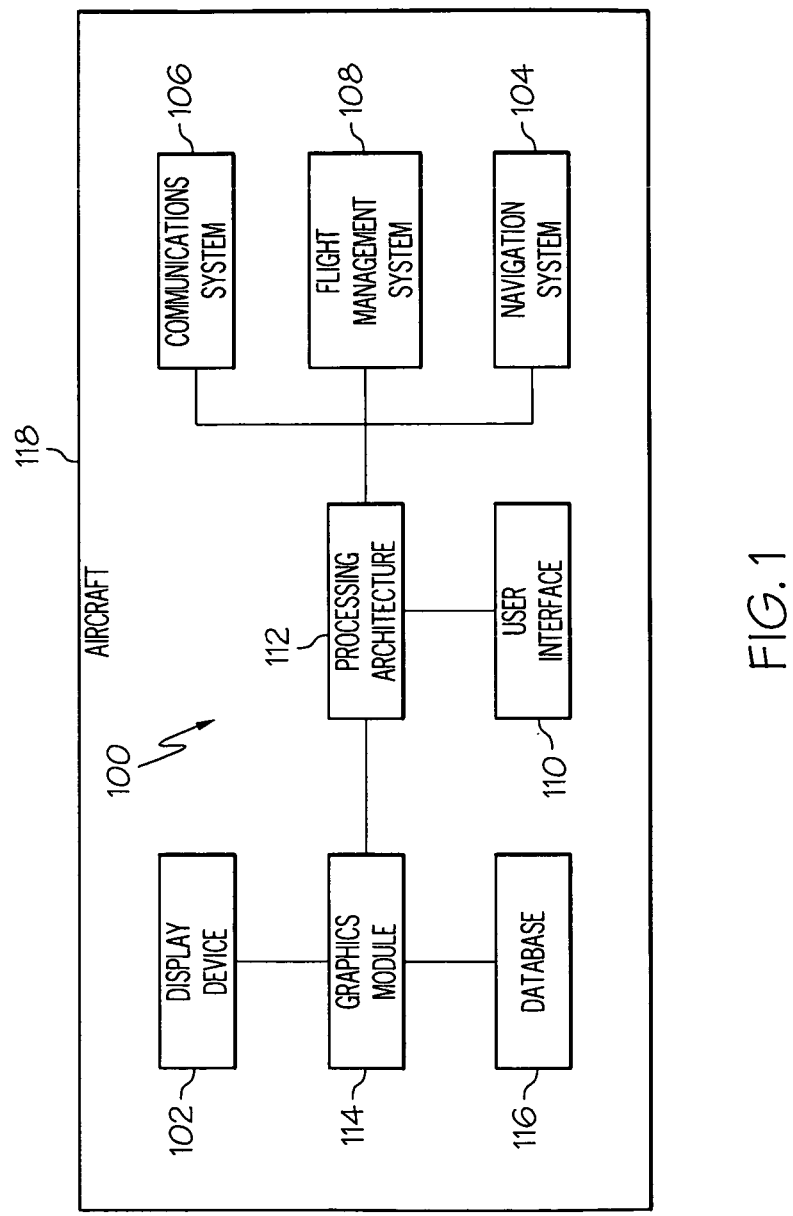
FIG. 1 is a block diagram of a display system suitable for use in an aircraft in accordance with one embodiment.

The following detailed description is merely exemplary in nature and is not intended to limit the subject matter of the application and uses thereof. Furthermore, there is no intention to be bound by any theory presented in the preceding background or the following detailed description.

Techniques and technologies may be described herein in terms of functional and/or logical block components, and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

For the sake of brevity, conventional techniques related to graphics and image processing, navigation, flight planning, aircraft controls, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Technologies and concepts discussed herein relate to display systems adapted for displaying, on a display device associated with an aircraft, a vertical profile for an aircraft action such as an instrument approach. The vertical profile is displayed and/or rendered with a fixed uniform vertical scale and a nonuniform horizontal scale. This allows the entire vertical profile to be displayed and/or rendered within a limited amount of display area on the display device, while accurately representing the position of the aircraft with respect to the underlying terrain and the approach course. As a result, the desired and/or relevant instrument procedure information may thereby be concurrently presented on the same display device as the navigational map in a manner that does not degrade the situational awareness provided by the navigational map while improving the situational awareness regarding the execution of the approach.

FIG. 1 depicts an exemplary embodiment of a display system 100, which may be located onboard an aircraft 118. In an exemplary embodiment, the display system 100 includes, without limitation, a display device 102, a navigation system 104, a communications system 106, a flight management system 108 (FMS), a processing architecture 112, and a graphics module 114. The display system 100 may further include a user interface 110 for enabling interactivity with the display system 100 and a database 116 suitably configured to support operation of the display system 100, as described in greater detail below. It should be understood that FIG. 1 is a simplified representation of a display system 100 for purposes of explanation and ease of description, and FIG. 1 is not intended to limit the application or scope of the subject matter in any way. In practice, the display system 100 and/or aircraft 118 will include numerous other devices and components for providing additional functions and features, as will be appreciated in the art.

In an exemplary embodiment, the display device 102 is coupled to the graphics module 114. The graphics module 114 is coupled to the processing architecture 112, and the processing architecture 112 and the graphics module 114 are cooperatively configured to display, render, or otherwise convey one or more graphical representations or images associated with operation of the aircraft 118 on the display device 102, as described in greater detail below. The processing architecture 112 is coupled to the navigation system 104 for obtaining real-time navigational data and/or information regarding operation of the aircraft 118 to support operation of the display system 100. In an exemplary embodiment, the communications system 106 is coupled to the processing architecture 112 and configured to support communications to and/or from the aircraft 118, as will be appreciated in the art and described in greater detail below. The processing architecture 112 is also coupled to the flight management system 108, which in turn, may also be coupled to the navigation system 104 and the communications system 106 for providing real-time data and/or information regarding operation of the aircraft 118 to the processing architecture 112 to support operation of the aircraft 118, as will be appreciated in the art. In an exemplary embodiment, the user interface 110 is coupled to the processing architecture 112, and the user interface 110 and the processing architecture 112 are cooperatively configured to allow a user to interact with the display device 102 and other elements of display system 100, as described in greater detail below.

In an exemplary embodiment, the display device 102 is realized as an electronic display configured to graphically display flight information or other data associated with operation of the aircraft 118 under control of the graphics module 114. In an exemplary embodiment, the display device 102 is located within a cockpit of the aircraft 118. It will be appreciated that although FIG. 1 shows a single display device 102, in practice, additional display devices may be present onboard the aircraft 118. In an exemplary embodiment, the user interface 110 is also located within the cockpit of the aircraft 118 and adapted to allow a user (e.g., pilot, co-pilot, or crew member) to interact with the display system 100 and enables a user to indicate, select, or otherwise manipulate content displayed on the display device 102, as described in greater detail below. In various embodiments, the user interface 110 may be realized as a keypad, touchpad, keyboard, mouse, touchscreen, joystick, microphone, or another suitable device adapted to receive input from a user. It should be appreciated that although FIG. 1 shows the display device 102 and the user interface 110 as being located within the aircraft 118, in practice, the display device 102 and/or user interface 110 may be located outside the aircraft 118 (e.g., on the ground as part of an air traffic control center or another command center) and communicatively coupled to the remaining elements of the display system 100 (e.g., via a data link).

In an exemplary embodiment, the navigation system 104 is configured to obtain one or more navigational parameters associated with operation of the aircraft 118. The navigation system 104 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 104, as will be appreciated in the art. In an exemplary embodiment, the navigation system 104 is capable of obtaining and/or determining the instantaneous position of the aircraft 118, that is, the current location of the aircraft 118 (e.g., the latitude and longitude) and the altitude or above ground level for the aircraft 118. In some embodiments, the navigation system 104 may also obtain and/or determine the heading of the aircraft 118 (i.e., the direction the aircraft is traveling in relative to some reference).

In an exemplary embodiment, the communications system 106 is suitably configured to support communications between the aircraft 118 and another aircraft or ground location (e.g., air traffic control). In this regard, the communications system 106 may be realized using a radio communication system or another suitable data link system. In an exemplary embodiment, the flight management system 108 (or, alternatively, a flight management computer) is located onboard the aircraft 118. Although FIG. 1 is a simplified representation of display system 100, in practice, the flight management system 108 may be coupled to one or more additional modules or components as necessary to support navigation, flight planning, and other aircraft control functions in a conventional manner.

In accordance with one or more embodiments, the flight management system 108 includes or otherwise accesses a database that contains procedure information for a plurality of airports. As used herein, procedure information should be understood as a set of operating parameters or instructions associated with a particular aircraft action (e.g., landing and/or approach, take off and/or departure, taxiing) that may be undertaken by the aircraft 118 at a particular airport. In this regard, an airport should be understood as referring to a location suitable for landing (or arrival) and/or takeoff (or departure) of an aircraft, such as, for example, airports, runways, landing strips, and other suitable landing and/or departure locations. In an exemplary embodiment, the flight management system 108 maintains the association of the procedure information and the corresponding airport. In an exemplary embodiment, the procedure information maintained by the flight management system 108 (e.g., in a database) comprises instrument procedure information traditionally displayed on a published chart (or approach plate) for the airport, as will be appreciated in the art. In this regard, the procedure information may comprise instrument approach procedures, standard terminal arrival routes, instrument departure procedures, standard instrument departure routes, obstacle departure procedures, or other suitable instrument procedure information. It should be appreciated that although the subject matter may described herein in the context of an instrument approach procedure for purposes of explanation, the subject matter is not intended to be limited to an approach procedure, and in practice, the subject matter may be implemented for departures and other aircraft actions in a similar manner as described below.

Each airport (or landing location) may have one or more predefined approaches associated therewith, wherein each approach may have instrument approach procedure information associated therewith. For example, an airport may comprise a plurality of possible approaches depending on the particular airport runway chosen for landing. In this regard, the flight management system 108 maintains the association of the instrument approach procedure information and the corresponding approach for each airport or landing location. In a similar manner, an airport (or departure location) may have at least one departure route having instrument departure procedure information associated therewith, as will be appreciated in the art. In an exemplary embodiment, the flight management system 108, the processing architecture 112 and the graphics module 114 are cooperatively configured to render and/or display instrument approach procedure information for an identified approach (or instrument departure procedure information for an identified departure route) on the display device 102, as described in greater detail below.

The processing architecture 112 generally represents the hardware, software, and/or firmware components configured to facilitate the display and/or rendering of instrument procedure information on the display device 102 and perform additional tasks and/or functions described in greater detail below. Depending on the embodiment, the processing architecture 112 may be implemented or realized with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. The processing architecture 112 may also be implemented as a combination of computing devices, e.g., a combination of a digital signal processor and a microprocessor, a plurality of microprocessors, one or more microprocessors in conjunction with a digital signal processor core, or any other such configuration. In practice, the processing architecture 112 includes processing logic that may be configured to carry out the functions, techniques, and processing tasks associated with the operation of the display system 100, as described in greater detail below. Furthermore, the steps of a method or algorithm described in connection with the embodiments disclosed herein may be embodied directly in hardware, in firmware, in a software module executed by the processing architecture 112, or in any practical combination thereof.

The graphics module 114 generally represents the hardware, software, and/or firmware components configured to control the display and/or rendering of instrument procedure information on the display device 102 and perform additional tasks and/or functions described in greater detail below. In an exemplary embodiment, the graphics module 114 accesses one or more databases 116 suitably configured to support operations of the graphics module 114, as described below. In this regard, the database 116 may comprise a terrain database, an obstacle database, a navigational database, a geopolitical database, or other information for rendering and/or displaying content related to an instrument approach procedure on the display device 102, as described below.

Figure 2:
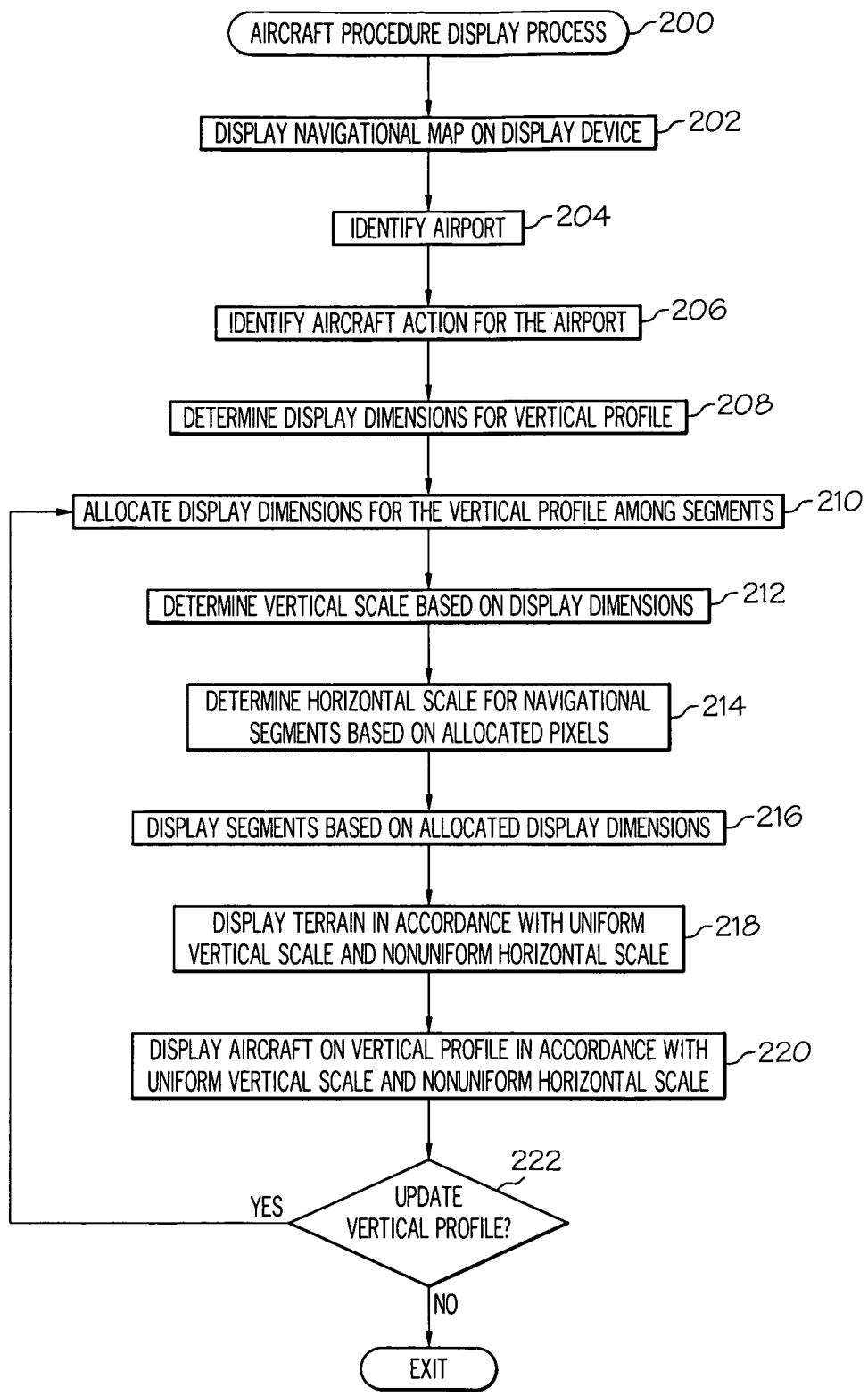
FIG. 2 is a flow diagram of an exemplary aircraft procedure display process suitable for use with the display system of FIG. 1 in accordance with one embodiment.

Referring now to FIG. 2, in an exemplary embodiment, a display system 100 may be configured to perform an aircraft procedure display process 200 and additional tasks, functions, and operations described below. The various tasks may be performed by software, hardware, firmware, or any combination thereof. For illustrative purposes, the following description may refer to elements mentioned above in connection with FIG. 1. In practice, the tasks, functions, and operations may be performed by different elements of the described system, such as the display device 102, the navigation system 104, the communications system 106, the flight management system 108, the user interface 110, the processing architecture 112, the graphics module 114 and/or the database 116. It should be appreciated that any number of additional or alternative tasks may be included, and may be incorporated into a more comprehensive procedure or process having additional functionality not described in detail herein.

Referring again to FIG. 2, and with continued reference to FIG. 1, an aircraft procedure display process 200 may be performed present aircraft procedure information (e.g., an instrument approach procedure or instrument departure procedure) for a desired aircraft action (e.g., an approach or a departure) at an airport on a display device in order to enable a user, such as a pilot or crew member, to review and/or brief the procedure without reliance on paper charts. It should be appreciated that although the aircraft procedure display process 200 is described in the context of an approach (or instrument approach procedure) for purposes of explanation, the aircraft procedure display process 200 may be implemented for instrument departure procedures and other procedures in a similar manner as described herein.

In an exemplary embodiment, the aircraft procedure display process 200 initializes by displaying a navigational map relating to operation of an aircraft on a display device associated with the aircraft (task 202). For example, referring now to FIG. 3, and with continued reference to FIG. 1 and FIG. 2, the aircraft procedure display process 200 may display and/or render a navigational map 300 associated with a current (or instantaneous) location of an aircraft on a display device in the aircraft. In this regard, the graphics module 114 may be configured to control the rendering of the navigational map 300, which may be graphically displayed on the display device 102. The aircraft procedure display process 200 may also be configured to render a graphical representation of the aircraft 302 on the map 300, which may be overlaid or rendered on top of a background 304. In an exemplary embodiment, the background 304 comprises a graphical representation of the terrain, topology, or other suitable items or points of interest corresponding to (or within a given distance of) a location of the aircraft 118, which may be maintained in a terrain database, a navigational database, a geopolitical database, or another suitable database. As described in greater detail below, the aircraft procedure display process 200 may also render a graphical representation of an airport 306 overlying the background 304. It should be appreciated that although the subject matter may be described herein in the context of a navigational map, the subject matter is not intended to be limited to a particular type of content displayed on the display device and the aircraft procedure display process 200 may be implemented with other types of content, such as, for example, an airport map or terminal map.

Figure 3:
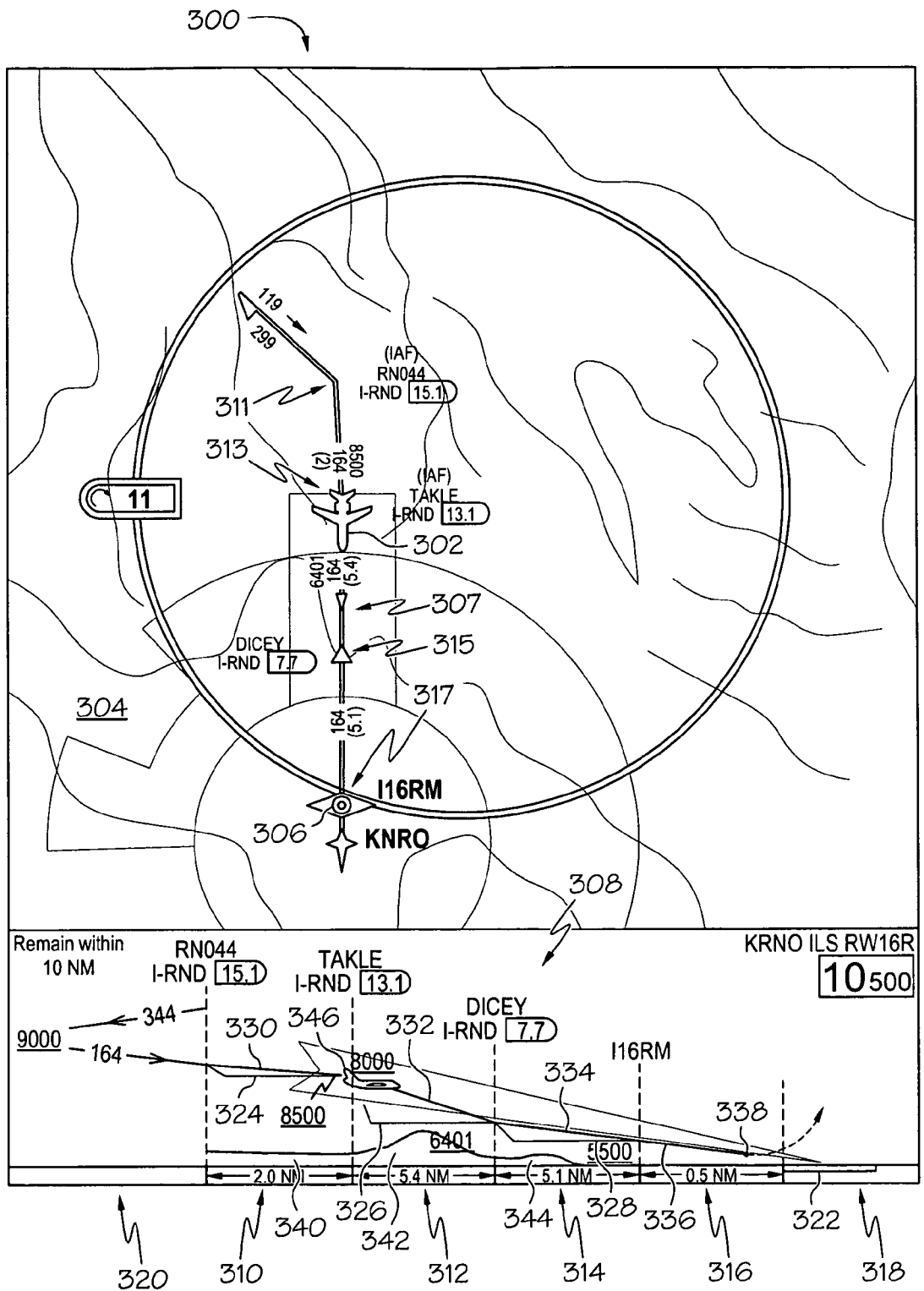
FIG. 3 is a schematic view of an exemplary navigational map including a vertical profile suitable for use with the aircraft procedure display process of FIG. 2 in accordance with one embodiment.

Although FIG. 3 depicts a top view (e.g., from above the aircraft 302) of the navigational map 300, in practice, alternative embodiments may utilize various perspective views, such as three-dimensional views (e.g., a three-dimensional synthetic vision display), angular or skewed views, and the like. Further, depending on the embodiment, the aircraft 302 may be shown as traveling across the map 300, or alternatively, as being located at a fixed position on the map 300, and FIG. 3 is not intended to limit the scope of the subject matter in any way. In an exemplary embodiment, the map 300 is associated with the movement of the aircraft, and the background 304 refreshes or updates as the aircraft travels, such that the graphical representation of the aircraft 302 is positioned over the terrain background 304 in a manner that accurately reflects the current (e.g., instantaneous or substantially real-time) real-world positioning of the aircraft 118 relative to the earth. In accordance with one embodiment, the map 300 is updated or refreshed such that it is centered on and/or aligned with the aircraft 302. Depending on the embodiment, the navigational map 300 may be oriented north-up (i.e., moving upward on the map 300 corresponds to traveling northward) or track-up or heading-up (i.e., aligned such that the aircraft 302 is always traveling in an upward direction and the background 304 adjusted accordingly), as will be appreciated in the art.

In an exemplary embodiment, the aircraft procedure display process 200 continues by identifying a desired airport (e.g., a landing and/or departure location) for the aircraft (task 204). In this regard, an airport may comprise a runway, a landing strip, an airstrip, or another suitable landing and/or departure location that has aircraft procedure information (e.g., instrument approach procedures or instrument departure procedures) associated therewith. In accordance with one embodiment, the aircraft procedure display process 200 may identify the desired airport using the navigational map 300 displayed on the display device 102. For example, as shown in FIG. 3, the aircraft procedure display process 200 may display an airport 306 proximate the aircraft 118 overlying the background 304 on the navigational map 300. The aircraft procedure display process 200 may identify the desired airport in response to a user selecting or indicating an airport displayed on the display device. For example, a user may manipulate the user interface 110 and indicate or otherwise select the airport 306 displayed on the map 300 as the desired airport (e.g., by positioning a cursor or pointer over airport 306 and clicking or otherwise selecting airport 306). In another embodiment, the aircraft procedure display process 200 may identify the desired airport using a predetermined (or predefined) flight plan. For example, the flight management system 108 may maintain a flight plan that specifies airport 306 as the final entry (or destination) of the flight plan.

In an exemplary embodiment, the aircraft procedure display process 200 continues by identifying a desired aircraft action for the identified airport, wherein the identified action has procedure information associated therewith (task 206). In this regard, an aircraft action should be understood as referring to an approach (or landing), a departure (or takeoff), taxiing, or another aircraft action having procedure information associated with the particular action. For example, in accordance with one embodiment, the aircraft procedure display process 200 may identify a desired approach for the identified airport. As used herein, an approach should be understood as referring to a predefined flight path or other guidance intended to facilitate a safe landing for an aircraft at a particular runway, landing strip, airstrip, or another suitable landing location. If the identified airport has only a single approach associated therewith (e.g., the airport is an airstrip or comprises a single runway), the aircraft procedure display process 200 may identify that approach as the desired approach. In accordance with one embodiment, if the identified aircraft has a plurality of possible approaches (e.g., the airport comprises a plurality of runways), the aircraft procedure display process 200 may identify or otherwise determine a default approach for use as a desired approach for the airport. For example, the aircraft procedure display process 200 may identify the most commonly used approach for the identified airport 306 as the default approach. Alternatively, the aircraft procedure display process 200 may identify the most recently used approach as the desired approach. In another embodiment, the aircraft procedure display process 200 determines and/or identifies the desired approach based on the current heading and/or location of the aircraft 118. For example, the aircraft procedure display process 200 may identify the approach with a final approach course most closely aligned with the current heading of the aircraft 118 as the desired approach. In yet another embodiment, the aircraft procedure display process 200 may identify or otherwise determine the desired approach based on an input from a user via user interface 110. As shown in FIG. 3, in response to identifying the desired approach for the airport 306, the aircraft procedure display process 200 may render and/or display a graphical representation of the approach course 307 on the navigational map 300.

As described in greater detail below, in response to identifying the aircraft action for the airport, the aircraft procedure display process 200 continues by displaying and/or rendering a vertical profile associated with the identified aircraft action based on the instrument procedure information for the identified aircraft action. Depending on the embodiment, the vertical profile may be rendered and/or displayed overlying the content displayed on the display device or adjacent to the content displayed on the display device. For example, as shown in FIG. 3, the vertical profile 308 may be rendered and/or displayed overlying the bottom (or lower) portion of the navigational map 300. It should be appreciated that in other embodiments, the vertical profile 308 may be rendered and/or displayed overlying (or adjacent to) the top (or upper) portion of the displayed content (e.g., navigational map 300), and the subject matter is not intended to be limited to any particular arrangement of the vertical profile with respect to other displayed content.

In an exemplary embodiment, the vertical profile is displayed and/or rendered with a uniform vertical scale and a nonuniform horizontal scale, as described in greater detail below. As used herein, a uniform vertical scale (or alternatively, a linear vertical scale) should be understood as a property and/or characteristic of the vertical profile such that the ratio of a vertical unit of distance on the display device (e.g., one pixel vertically) corresponds to the same real-world vertical distance (e.g., altitude) relative to a reference level (e.g., ground level or mean sea level) for any location within the vertical profile. As used herein, a nonuniform horizontal scale (or alternatively, a nonlinear horizontal scale) should be understood as a property and/or characteristic of the vertical profile such that the ratio of a horizontal unit of distance on the display device (e.g., one pixel horizontally) corresponds to a different real-world horizontal distance depending on the segment within the vertical profile.

In an exemplary embodiment, the vertical profile for the identified aircraft action comprises a plurality of segments, wherein each segment of the plurality of segments is associated with particular instrument approach procedure information pertaining to operating the aircraft within the region corresponding to the respective segment. For example, as shown in FIG. 3, the vertical profile 308 for the identified approach to the airport 306 comprises a plurality of navigational segments 310, 312, 314, 316 from a first navigational reference point 311 (e.g., an initial approach fix labeled as RNO44) to the landing location 306. In the illustrated embodiment, the first navigational segment 310 corresponds to a portion of the approach from the first navigational reference point 311 to a second navigational reference point 313 (e.g., labeled as TAKLE), the second navigational segment 312 corresponds to a portion of the approach from the second navigational reference point 313 to a third reference point 315 (e.g., labeled as DICEY), the third navigational segment 314 corresponds to a portion of the approach from the third reference point 315 to a fourth reference point 317 (e.g., labeled as I16RM), and the fourth navigational segment 316 corresponds to a portion of the approach from the fourth reference point 317 to the landing location 306. Depending on the particular approach and/or airport, the navigational reference points may comprise navigational aids, such as VHF omnidirectional ranges (VORs), distance measuring equipment (DMEs), tactical air navigation aids (TACANs), and combinations thereof (e.g., VORTACs), the landing and/or departure location (e.g., the runway) or other features on the ground, as well as position fixes (e.g., initial approach fixes (IAFs) and/or final approach fixes (FAFs)) and other navigational reference points used in area navigation (RNAV). As described in greater detail below, each segment of the plurality of navigational segments 310, 312, 314, 316 has an associated distance equal to the straight-line ground distance between the two navigational reference points that define the navigational segment. In addition, the navigational segments may also have altitude criteria (e.g., minimum descent altitudes) and additional instrument procedure information and/or criteria associated therewith. In addition, the vertical profile 308 may also comprise a runway segment 318 as well as a pre-approach segment 320, as described in greater detail below.

In an exemplary embodiment, the aircraft procedure display process 200 displays and/or renders the vertical profile by determining display dimensions for the vertical profile (task 208). In this regard, the aircraft procedure display process 200 determines the available area on the display device that will be dedicated and/or allocated to the vertical profile. For example, the display device may have a predetermined viewing area comprising a plurality of pixels (or image elements) arranged in a two-dimensional grid or matrix, wherein the display device has a fixed vertical resolution (e.g., a fixed number of horizontal rows of pixels) and a fixed horizontal resolution (e.g., a fixed number of vertical columns of pixels). The aircraft procedure display process 200 may determine display dimensions for the vertical profile by determining the number of rows of pixels (the vertical display dimension) on the display device to be dedicated and/or allocated to the vertical profile along with the number of columns of pixels (the horizontal display dimension) on the display device that will be dedicated and/or allocated to the vertical profile. In accordance with one or more embodiments, the display dimensions for the vertical profile may be determined as a percentage of the viewing area. For example, the vertical display dimension for the vertical profile may be determined as a percentage of the vertical resolution of the display device (e.g., fifteen percent of the total number of rows of pixels) and the horizontal display dimension for the vertical profile may be determined as a percentage of the horizontal resolution of the display device. As shown in FIG. 3, in an exemplary embodiment, the horizontal display dimension for the vertical profile 308 is equal to one hundred percent of the horizontal resolution of the viewing area of the display device, that is, the entire width of the viewing area. The vertical display dimension of the vertical profile 308 is constrained by the navigational map 300 which occupies a majority of the vertical dimension of the viewing area.

After determining the display dimensions for the vertical profile, the aircraft procedure display process 200 continues by allocating the display dimensions of the vertical profile among the segments that comprise the vertical profile (task 210). In this regard, the aircraft procedure display process 200 may allocate, to each segment, horizontal dimensions (e.g., a number of columns of pixels) and vertical dimensions (e.g., a number of rows of pixels) that comprise a subset of the display dimensions for the vertical profile. Preferably, the aircraft procedure display process 200 allocates sufficient dimensions to the segments such that the dimension of each segment allows the aircraft procedure display process 200 to adequately display and/or convey the instrument procedure information associated with the respective segment within the respective segment. In an exemplary embodiment, the aircraft procedure display process 200 allocates the same vertical dimensions to each segment, such that, for example, each segment comprises the same number of rows of pixels resulting in a vertical profile of uniform vertical dimension. The aircraft procedure display process 200 continues by allocating horizontal dimensions to the individual segments, and depending on the embodiment, the horizontal dimensions of the segments may or may not be uniform. For example, the aircraft procedure display process 200 may allocate a first number of columns of pixels to the first segment 310 and a second number of columns of pixels to the second segment 312. In accordance with one embodiment, the navigational segments are allocated horizontal dimensions in a piecewise linear fashion as shown in FIG. 3, that is, each navigational segment 310, 312, 314, 316 is allocated the same number of columns of pixels. In alternative embodiments, the navigational segments may be allocated horizontal dimensions nonuniformly, that is, a first navigational segment may be allocated a first number of columns of pixels and a second navigational segment may be allocated a different number of columns of pixels. In a similar manner, the aircraft procedure display process 200 may allocate horizontal dimensions to the other segments 318, 320 that are the same as and/or different from those allocated to the navigational segments 310, 312, 314, 316.

In an exemplary embodiment, the aircraft procedure display process 200 continues by determining the uniform vertical scale for the segments of the vertical profile based on the allocated display dimensions (task 212). As used herein, the vertical scale should be understood as the ratio of a vertical unit of distance on the display device (e.g., moving one pixel vertically or one row of pixels) to the equivalent real-world vertical distance (e.g., altitude) relative to a reference level (e.g., ground level or mean sea level). The vertical scale is the same for each segment of the vertical profile, such that the vertical profile is displayed with a uniform vertical scale. In accordance with embodiment, the aircraft procedure display process 200 determines the vertical scale for the navigational segments of the vertical profile based on the highest altitude minimum among the plurality of segments that comprise the vertical profile. The aircraft procedure display process 200 may identify the segment having the highest altitude minimum, and determine the vertical scale based on the altitude minimum associated with the identified segment. For example, as shown in FIG. 3, the pre-approach segment 320 has the highest altitude minimum (e.g., 9,000 ft) among the plurality of segments 310, 312, 314, 316, 318, 320. The aircraft procedure display process 200 may determine the vertical scale based on difference between the altitude minimum for the segment 320 and the lowest reference level for the vertical profile 308 (e.g., the elevation of the airport 306). Preferably, the aircraft procedure display process 200 determines the uniform vertical scale as a ratio of a number of rows of pixels to the difference between the highest altitude minimum and the lowest reference level for the vertical profile in a manner that accounts for textual display of the instrument procedure information within the vertical profile as shown in FIG. 3.

In an exemplary embodiment, the aircraft procedure display process 200 continues by determining the horizontal scale for the navigational segments of the vertical profile (task 214). The horizontal scale should be understood as the ratio of a horizontal unit of distance on the display device (e.g., moving one pixel horizontally or one column of pixels) to the equivalent distance on the ground. In an exemplary embodiment, the aircraft procedure display process 200 determines the horizontal scale for each navigational segment based on the allocated horizontal dimensions for the respective segment and the distance associated with the respective segment. In this regard, because the allocated horizontal dimensions and/or the distances associated with each respective segment may vary for each navigational segment, the resulting horizontal scale for the vertical profile may be nonuniform. For example, FIG. 3 depicts a piecewise linear allocation of pixels among the navigational segments 310, 312, 314, 316 wherein each navigational segment 310, 312, 314, 316 comprises the same horizontal dimensions, that is, the same number of columns of pixels are allocated to each navigational segment 310, 312, 314, 316. However, the distances associated with the individual navigational segments 310, 312, 314, 316 vary. As shown, the first navigational segment 310 has an associated distance of two nautical miles, while the second and third navigational segments 312, 314 have associated distances greater than five nautical miles each, and the fourth navigational segment 316 has an associated distance of only half of a nautical mile. As a result, the ratio of horizontal dimensions to distance varies for each segment. For example, one pixel horizontally within the second navigational segment 312 corresponds to a greater horizontal distance on the ground than one pixel horizontally within the other segments 310, 314, 316. In other words, the horizontal scales for the navigational segments 310, 312, 314, 316 are not equal, resulting in a nonuniform horizontal scale for the vertical profile 308.

In an exemplary embodiment, the aircraft procedure display process 200 continues by displaying and/or rendering the segments of the vertical profile on the display device based on the allocated display dimensions (task 216). For example, in the illustrated embodiment of FIG. 3, each segment 310, 312, 314, 316, 318, 320 are displayed and/or rendered with the same vertical dimension (i.e., each segment 310, 312, 314, 316, 318, 320 is allocated and occupies the same number of rows of pixels), while the navigational segments 310, 312, 314, 316 are displayed and/or rendered with the same (or equal) horizontal dimension (i.e., piecewise linear allocation of columns of pixels among the navigational segments 310, 312, 314, 316).

In an exemplary embodiment, the aircraft procedure display process 200 also displays and/or renders the navigational information and/or instrument procedure information within the vertical profile. For example, as shown in FIG. 3, the navigational reference points 311, 313, 315, 317 that represent boundaries for the navigational segments 310, 312, 314, 316 may be rendered and/or displayed on the vertical profile 308. In addition, the instrument procedure information and/or other navigational information for the individual segments are displayed and/or rendered within the respective segment. For example, as shown in FIG. 3, the ground distance corresponding to the first navigational segment 310 (e.g., two nautical miles of the distance between reference points 311, 313) and the altitude minimum (e.g., 8,500 feet) are both displayed and/or rendered within the first navigational segment 310. Likewise, the ground distances corresponding to the other navigational segments 312, 314, 316 and the altitude minima are also displayed and/or rendered within the respective navigational segment 312, 314, 316. In addition, aircraft procedure display process 200 may display pre-approach information within the pre-approach segment 320 and the aircraft procedure display process 200 may also display and/or render a graphical representation of the landing location 322 (e.g., a runway at airport 306) along with the elevation of the landing location 322 within the runway segment 318.

In an exemplary embodiment, the aircraft procedure display process 200 displays and/or renders a graphical representation of the altitude criteria for the plurality of segments based on the vertical scale for the vertical profile. In this regard, the aircraft procedure display process 200 may display and/or render a horizontal line within a respective segment that is positioned vertically within the respective segment based on the uniform vertical scale such that the line corresponds to the altitude criterion (e.g., the minimum descent altitude) for the respective segment. For example, as shown in FIG. 3, the aircraft procedure display process 200 may display and/or render a horizontal line 324 within the first navigational segment 310 that corresponds to the minimum descent altitude associated with the first navigational segment 310 (e.g., 8,500 feet), wherein the horizontal line 324 is positioned vertically based on the uniform vertical scale. In a similar manner, the aircraft procedure display process 200 displays and/or renders a horizontal line 326 within the second navigational segment 312 that corresponds to the minimum descent altitude (e.g., 6,401 feet) associated with the second navigational segment 312 and a horizontal line 328 within the third navigational segment 314 that corresponds to the minimum descent altitude (e.g., 5,500 feet) associated with the third navigational segment 314. In this manner, instrument procedure information and/or navigational information related to altitude (e.g., altitude minimums) is displayed and/or rendered based on the uniform vertical scale for the vertical profile.

In an exemplary embodiment, the aircraft procedure display process 200 displays and/or renders a profile view of the flight path (e.g., an approach course or departure course) for the identified aircraft action on the vertical profile based on the uniform vertical scale and the nonuniform horizontal scale. In this regard, the profile view of the flight path consists of a plurality of line segments connecting the minimum descent altitudes across the navigational segments corresponding to the altitude minimums at each navigational reference point. For example, as shown in FIG. 3, the profile view of the approach course 307 consists of a first line segment 330 from the pre-approach altitude minimum (e.g., 9,000 feet) at the border of the pre-approach segment 310 and the first navigational segment 310 (i.e., the minimum altitude at the first navigational reference point 311) to the altitude minimum associated with the first navigational segment 310 (e.g., 8,500 feet) at the border with the second navigational segment 312. A second line segment 332 of the profile view of the approach course 307 connects from the altitude minimum for the first navigational segment 310 at the border with the second navigational segment 312 (i.e., the minimum altitude at the second navigational reference point 313) to the altitude minimum associated with the second navigational segment 312 (e.g., 6,401 feet) at the border of the third navigational segment 314. A third line segment 334 of the approach course connects from the altitude minimum for the second navigational segment 312 at the border with the third navigational segment 314 (i.e., the minimum altitude at the third navigational reference point 315) to the altitude minimum for the third navigational segment 314 (e.g., 5,500 feet) at the border of the fourth navigational segment 316. As shown, the final line segment 336 of the profile view of the approach course 307 connects from the altitude minimum for the third navigational segment 314 at the border with the fourth navigational segment 316 (i.e., the minimum altitude at the fourth navigational reference point 317) to the missed approach point 338 (MAP). In alternative embodiments, instead of ending at the missed approach point 338, the final line segment 336 may continue to the landing location 322. As a result, a profile view of the approach course 307 is displayed in the vertical profile 308 in a manner that is influenced by the uniform vertical scale and nonuniform horizontal scale.

In an exemplary embodiment, the aircraft procedure display process 200 continues by displaying and/or rendering a graphical representation of terrain associated with the vertical profile, that is, the terrain underlying the approach course for the respective segments of the approach (task 218). The aircraft procedure display process 200 renders and/or displays the graphical representation of the terrain within the vertical profile in a manner that is influenced by the uniform vertical scale and nonuniform horizontal scale of the vertical profile, that is, the vertical features and/or elevation of the terrain are displayed and/or rendered in accordance with the uniform fixed vertical scale while the horizontal cross-sectional view of the terrain is rendered and/or displayed in accordance with the horizontal scale of the individual segments (i.e., the nonuniform horizontal scale of the vertical profile). For example, as shown in FIG. 3, the graphical representation of the terrain 340 within the first navigational segment 310 is displayed and/or rendered based on the uniform vertical scale for the vertical profile 308 and the horizontal scale for the first navigational segment 310, the graphical representation of the terrain 342 within the second navigational segment 312 is displayed and/or rendered based on the uniform vertical scale and the horizontal scale for the second navigational segment 312, the graphical representation of the terrain 344 within the third navigational segment 314 is displayed and/or rendered based on the uniform vertical scale and the horizontal scale for the third navigational segment 314, and so on. In this manner, the terrain underlying the approach course 307 for the plurality of segments is rendered on the vertical profile 308 in a manner that accurately reflects the relationship of the real-world terrain relative to the altitude minima and the distances associated with the individual segments.

In an exemplary embodiment, the aircraft procedure display process 200 continues by displaying and/or rendering a graphical representation of the aircraft within the vertical profile in accordance with the uniform vertical scale and the nonuniform horizontal scale (task 220). In an exemplary embodiment, the aircraft procedure display process 200 obtains the instantaneous position of the aircraft and displays and/or renders a graphical representation of the aircraft within the segment corresponding to the aircraft's position. For example, as shown in the navigational map 300 of FIG. 3, the aircraft 302 has just traversed the TAKLE intersection, indicating that the aircraft 302 is within the second navigational segment 312. As shown, a second graphical representation of the aircraft 346 is rendered and/or displayed in the vertical profile 308 within the second navigational segment 312. In an exemplary embodiment, the aircraft 346 is positioned vertically within the navigational segment 312 based on the fixed vertical scale such that it corresponds to the instantaneous altitude of the aircraft. As shown, the instantaneous altitude (e.g., 8,000 feet) may also be displayed and/or rendered in a textual format proximate the aircraft symbology 346. The aircraft 346 is positioned horizontally within the second navigational segment 312 based on the horizontal scale for the navigational segment 312 such that the position of the aircraft 346 with respect to the segment boundaries corresponds to the relative real-world position of the aircraft between the two reference points 313, 315 that define the segment 312. In this manner, the aircraft 346 is vertically and horizontally positioned with respect to the terrain 342 within the navigational segment 312 in a manner that reflects the relative real-world positioning of the aircraft with respect to the underlying real-world terrain. The aircraft procedure display process 200 may continue to update the positioning of the aircraft 346 within the vertical profile 308 (and the positioning of the aircraft 302 on the navigational map 300) as the aircraft travels.

Figure 4:
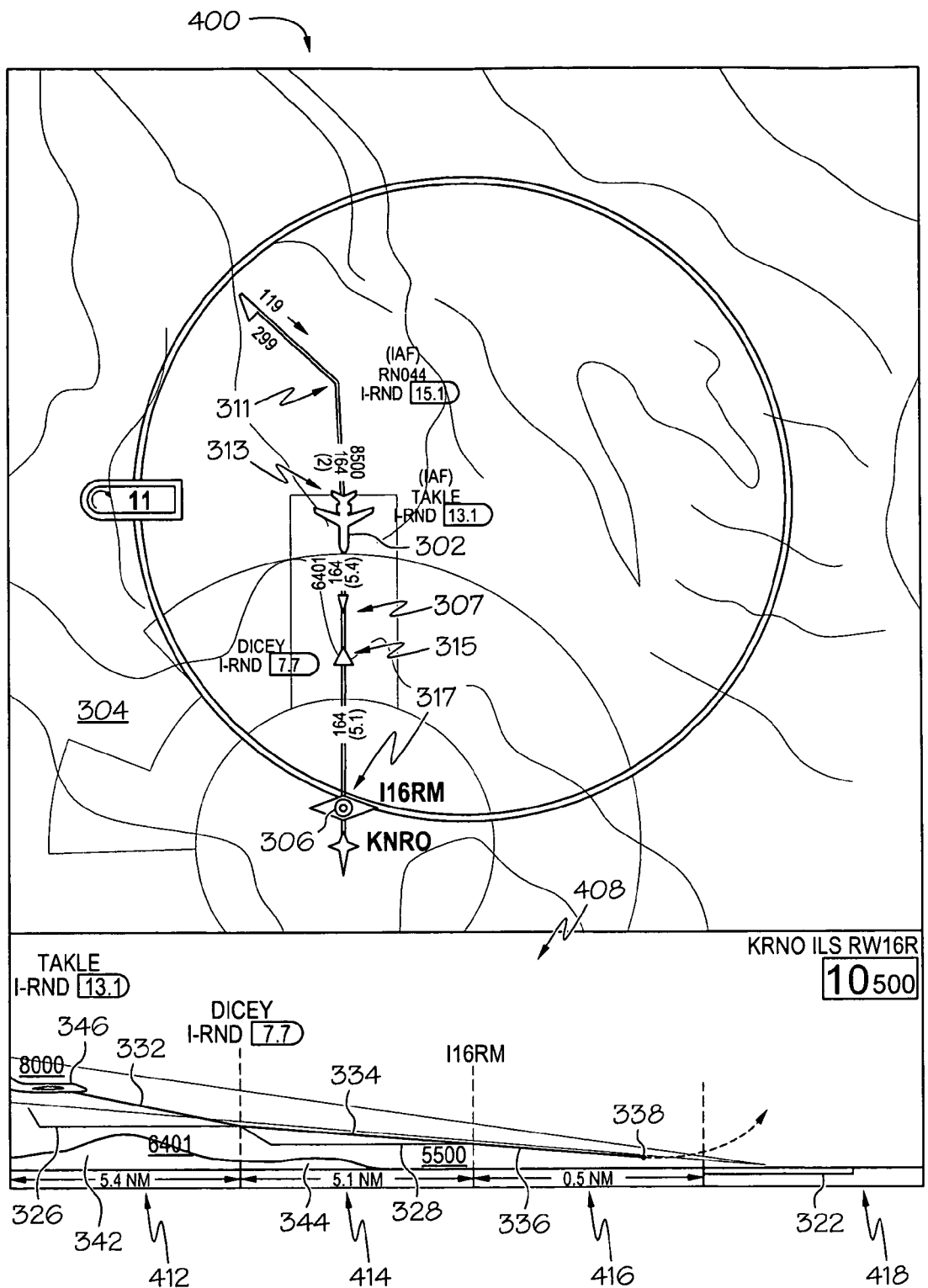
FIG. 4 is a schematic view of an exemplary navigational map including a vertical profile suitable for use with the aircraft procedure display process of FIG. 2 in accordance with one embodiment.

In accordance with one embodiment, the aircraft procedure display process 200 continues by determining whether the vertical profile should be updated (task 222). In this regard, if the aircraft procedure display process 200 determines and/or identifies that one of the more segments on the vertical profile are no longer relevant, for example, if the aircraft has already traversed through one or more segments of the vertical profile, the aircraft procedure display process 200 may reallocate the display dimensions of the vertical profile among the remaining segments in a similar manner as described above (task 210). For example, referring now to FIG. 3 and FIG. 4, in response to identifying and/or determining the instantaneous location of the aircraft is within the second navigational segment 312, the aircraft procedure display process 200 may update the vertical profile 308 by removing the pre-approach segment 320 and first navigational segment 310 and reallocating the display dimensions for the vertical profile 308 among the remaining relevant segments 312, 314, 316, 318 resulting in the vertical profile 408 overlying the bottom portion of the navigational map 400 of FIG. 4. For example, as shown in FIG. 4, the display dimensions have been reallocated in a piecewise linear manner across the remaining navigational segments 412, 414, 416. The aircraft procedure display process 200 may determine an updated vertical and/or horizontal scale for the vertical profile 408 and display the remaining segments 412, 414, 416, 418 in a similar manner as set forth above (tasks 212, 214, 216). In this manner, navigational segments 412, 414, 416 are allocated updated horizontal dimensions, resulting in an updated horizontal scale for each of the navigational segments 412, 414, 416. The vertical scale and/or horizontal scale for the vertical profile 408 may or may not be different from the vertical scale and/or horizontal scale for the previously displayed vertical profile 308, however, the vertical profile 408 retains the characteristic of a uniform vertical scale across segments. In this manner, the nonuniform horizontal scale may be dynamically updated based on the instantaneous position of the aircraft. The aircraft procedure display process 200 continues by displaying the terrain and the aircraft within the updated vertical profile 408 in a similar manner as set forth above (tasks 218, 220). The loop defined by tasks 210, 212, 214, 216, 218, 220 may repeat as desired to dynamically update the vertical profile until the aircraft has completed the identified aircraft action.

One advantage of the systems and/or methods described above is that the vertical profile for an approach (or departure) may be displayed and/or rendered in a manner that accurately reflects the relative real-world position of the aircraft with respect to the terrain and/or airport within a limited display area. The vertical profile is displayed and/or rendered with a nonuniform horizontal scale which allows the entire vertical profile to be displayed and/or rendered within the available display area regardless of the length of the navigational segments that comprise the approach. The vertical profile is also displayed and/or rendered with a fixed uniform vertical scale based on the altitude minimums and the amount of available display area. As a result, the terrain associated with the approach may be displayed and/or rendered within the vertical profile based on the nonuniform horizontal scale and the fixed uniform vertical scale such that the graphical representation of the terrain accurately reflects the relative real-world positioning of the terrain with respect tot eh airport. A graphical representation of the aircraft may also be displayed within the vertical profile based on the nonuniform horizontal scale and the fixed uniform vertical scale. In this manner, the limited available display area is utilized to allow a user, such as a pilot or co-pilot, to quickly and intuitively ascertain the relative real-world positioning of the aircraft with respect to the approach course, the airport, the navigational reference points, the minimum descent altitude, and the underlying terrain. The vertical profile is positioned with respect to a navigational map or other displayed content in a manner that allows the user to maintain situational awareness while simultaneously reviewing the instrument procedure information associated with the vertical profile.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It being understood that various changes may be made in the function and arrangement of elements described in an exemplary embodiment without departing from the scope of the subject matter as set forth in the appended claims.

What is claimed is:

1. A method for presenting procedure information for a vertical profile of an aircraft action comprising a plurality of navigational segments on a display device associated with an aircraft, the method comprising:

displaying a first navigational segment of the plurality of navigational segments with a vertical scale and a first horizontal scale, the first horizontal scale being based on a first distance associated with the first navigational segment and first horizontal dimensions of the first navigational segment on the display device, the first distance being equal to a first ground distance between a first navigational reference point and a second navigational reference point defining the first navigational segment; and displaying a second navigational segment of the plurality of navigational segments with the vertical scale and a second horizontal scale, the second horizontal scale being based on a second distance associated with the second navigational segment and second horizontal dimensions of the second navigational segment on the display device, the second distance being equal to a second ground distance between the second navigational reference point and a third navigational reference point defining the second navigational segment, wherein the first horizontal scale and the second horizontal scale are not equal.

2. The method of claim 1, further comprising:

displaying a first graphical representation of terrain within the first navigational segment, wherein the first graphical representation of terrain is displayed based on the vertical scale and the first horizontal scale; and displaying a second graphical representation of terrain within the second navigational segment, wherein the second graphical representation of terrain is displayed based on the vertical scale and the second horizontal scale.

3. The method of claim 1, further comprising displaying a graphical representation of the aircraft on the display device within the first navigational segment, wherein the graphical representation of the aircraft is positioned based on the vertical scale and the first horizontal scale such that the graphical representation of the aircraft accurately reflects an instantaneous position of the aircraft.

4. The method of claim 1, further comprising:
allocating the first horizontal dimensions to the first navigational segment, the first horizontal scale being equal to a ratio of the first horizontal dimensions to the first distance; and
allocating the second horizontal dimensions to the second navigational segment, the second horizontal scale being equal to a ratio of the second horizontal dimensions to the second distance.

5. The method of claim 4, wherein:
allocating the first horizontal dimensions to the first navigational segment comprises allocating a first number of columns of pixels to the first navigational segment, the first horizontal scale being equal to the first number divided by the first distance; and
allocating the second horizontal dimensions to the second navigational segment comprises allocating a second number of columns of pixels to the second navigational segment, the second horizontal scale being equal to the second number divided by the second distance.

6. The method of claim 5, the first distance and the second distance being unequal, wherein allocating the second horizontal dimensions to the second navigational segment comprises allocating the second number of columns of pixels to the second navigational segment, the second number being equal to the first number.

7. The method of claim 1, further comprising:
displaying the first distance within the first navigational segment; and
displaying the second distance within the second navigational segment.

8. The method of claim 1, further comprising displaying a graphical representation of a flight path for an approach on the display device within the vertical profile, wherein the graphical representation of the flight path is influenced by the vertical scale, the first horizontal scale, and the second horizontal scale.

9. A method for presenting procedure information for an aircraft action between a first navigational reference point and a second navigational reference point on a display device associated with an aircraft, the method comprising:
rendering a vertical profile for the aircraft action on the display device, wherein the vertical profile is rendered with a uniform vertical scale and a nonuniform horizontal scale; and
rendering a graphical representation of the aircraft on the display device within the vertical profile, wherein the graphical representation of the aircraft is positioned within the vertical profile based on the nonuniform horizontal scale and the uniform vertical scale such that the graphical representation of the aircraft accurately reflects an instantaneous position of the aircraft.

10. The method of claim 9, the vertical profile including a plurality of navigational segments, wherein rendering the vertical profile with the nonuniform horizontal scale comprises:
allocating equal horizontal dimensions to a first navigational segment of the plurality of navigational segments and a second navigational segment of the plurality of navigational segments;
rendering the first navigational segment with the uniform vertical scale and a first horizontal scale; and
rendering the second navigational segment of the plurality of navigational segments with the uniform vertical scale and a second horizontal scale, wherein the first horizontal scale and the second horizontal scale are not equal.

11. The method of claim 10, further comprising:
determining the first horizontal scale based on a first distance associated with the first navigational segment and the allocated horizontal dimensions; and
determining the second horizontal scale based on a second distance associated with the second navigational segment and the allocated horizontal dimensions, wherein the first distance and the second distance are unequal.

12. The method of claim 10, wherein rendering the graphical representation of the aircraft comprises rendering the graphical representation of the aircraft on the display device within the first navigational segment, wherein the graphical representation of the aircraft is positioned within the first navigational segment based on the first horizontal scale and the uniform vertical scale such that the graphical representation of the aircraft accurately reflects the instantaneous position of the aircraft.

13. The method of claim 10, further comprising:
rendering a first graphical representation of terrain within the first navigational segment, wherein the first graphical representation of terrain is rendered based on the uniform vertical scale and the first horizontal scale; and
rendering a second graphical representation of terrain within the second navigational segment, wherein the second graphical representation of terrain is rendered based on the uniform vertical scale and the second horizontal scale.

14. The method of claim 9, further comprising updating the nonuniform horizontal scale based on the instantaneous position of the aircraft.

15. The method of claim 9, further comprising rendering a graphical representation of terrain on the display device within the vertical profile, wherein the graphical representation of terrain is rendered based on the uniform vertical scale and the nonuniform horizontal scale such that the positioning of the graphical representation of the aircraft with respect to the graphical representation of terrain accurately reflects the instantaneous position of the aircraft with respect to the terrain.

16. The method of claim 9, further comprising rendering a graphical representation of a flight path for the aircraft action on the display device within the vertical profile, wherein the graphical representation of the flight path is displayed based on the uniform vertical scale and the nonuniform horizontal scale.

17. A display system onboard an aircraft comprising a display device having rendered thereon:
a navigational map; and
a vertical profile for an approach with a uniform vertical scale comprising:
a first navigational segment having a first horizontal scale being based on a first distance associated with the first navigational segment; and
a second navigational segment having a second horizontal scale based on a second distance associated with the second navigational segment, wherein the first horizontal scale and the second horizontal scale are not equal.

18. The display system of claim 17, wherein the first navigational segment and the second navigational segment are allocated display dimensions within a viewing area on the display device such that a horizontal dimension of the first navigational segment is equal to a horizontal dimension of the second navigational segment, wherein the first horizontal scale is equal to a ratio of the horizontal dimension of the first navigational segment to the first distance and the second horizontal scale is equal to a ratio of the horizontal dimension of the second navigational segment to the second distance.

19. The display system of claim 17, wherein the vertical profile further comprises:
- a first graphical representation of terrain corresponding to the first navigational segment, wherein the first graphical representation of terrain is rendered within the first navigational segment based on the uniform vertical scale and the first horizontal scale; and
- a second graphical representation of terrain corresponding to the second navigational segment, wherein the second graphical representation of terrain is rendered within the second navigational segment based on the uniform vertical scale and the second horizontal scale.

20. The display system of claim 17, wherein the vertical profile further comprises a graphical representation of the aircraft within the first navigational segment based on an instantaneous position of the aircraft corresponding to the first navigational segment, wherein the graphical representation of the aircraft is positioned within the first navigational segment based on the uniform vertical scale and the first horizontal scale.

* * * * *